United States Patent [19]
Dueck et al.

[11] Patent Number: 6,011,884
[45] Date of Patent: Jan. 4, 2000

[54] INTEGRATED BI-DIRECTIONAL AXIAL GRADIENT REFRACTIVE INDEX/DIFFRACTION GRATING WAVELENGTH DIVISION MULTIPLEXER

[75] Inventors: Robert H. Dueck, Santa Ana, Calif.; Robert K. Wade, Edgewood, N.Mex.; Boyd V. Hunter; Joseph R. Dempewolf, both of Albuquerque, N.Mex.

[73] Assignee: LightChip, Inc., Salem, N.H.

[21] Appl. No.: 08/990,197

[22] Filed: Dec. 13, 1997

[51] Int. Cl.$^7$ .................................................. G02B 6/28
[52] U.S. Cl. .............................. 385/24; 385/33; 385/34; 385/37; 385/14; 385/49; 385/39; 359/130; 359/131; 372/50
[58] Field of Search ...................... 385/24, 33, 34, 385/37, 14, 49, 39; 359/130, 131; 372/50

[56] References Cited

U.S. PATENT DOCUMENTS

| | | | |
|---|---|---|---|
| 4,111,524 | 9/1978 | Tomlinson, III | 350/96.19 |
| 4,153,330 | 5/1979 | Tomlinson, III | 350/96.17 |
| 4,198,117 | 4/1980 | Kobayashi | 350/96.19 |
| 4,274,706 | 6/1981 | Tangonan | 350/96.19 |
| 4,279,464 | 7/1981 | Colombini | 350/96.19 |
| 4,299,488 | 11/1981 | Tomlinson, III | 356/328 |
| 4,343,532 | 8/1982 | Palmer | 350/96.19 |
| 4,387,955 | 6/1983 | Ludman et al. | 350/96.19 |
| 4,479,697 | 10/1984 | Kapany et al. | 350/96.18 |
| 4,522,462 | 6/1985 | Large et al. | 350/96.19 |
| 4,583,820 | 4/1986 | Flamand et al. | 350/96.19 |
| 4,622,662 | 11/1986 | Laude et al. | 370/3 |
| 4,626,069 | 12/1986 | Dammann et al. | 350/162.2 |
| 4,634,215 | 1/1987 | Reule | 350/96.16 |
| 4,643,519 | 2/1987 | Bussard et al. | 350/96.19 |
| 4,652,080 | 3/1987 | Carter et al. | 350/96.19 |
| 4,671,607 | 6/1987 | Laude | 350/96.15 |
| 4,703,472 | 10/1987 | Blumentritt et al. | 370/3 |
| 4,708,425 | 11/1987 | Gouali et al. | 350/96.16 |
| 4,726,645 | 2/1988 | Yamashita et al. | 350/96.18 |
| 4,740,951 | 4/1988 | Lizet et al. | 370/3 |

(List continued on next page.)

OTHER PUBLICATIONS

G. R. Harrison, Ph.D., Sc.D. et al., Practical Spectroscopy, Chapter 4—Diffraction–Grating Spectrographs, Prentice–Hall (1984) (no month available).

W. J. Tomlinson, Wavelength multiplexing in multimode optical fibers, Applied Optics, vol. 16, No. 8 (Aug. 1977).

W. J. Tomlinson et al., Optical multiplexer for multimode fiber transmission systems, Appl. Phys. Lett., vol. 31, No. 3 (Aug. 1977).

W. J. Tomlinson et al., Optical wavelength–division multiplexer for the 1–1.4 μm spectral region, Electronics Letters, vol. 14, No. 11 (May 25, 1973).

(List continued on next page.)

*Primary Examiner*—Rodney Bovernick
*Assistant Examiner*—Sung T. Kim
*Attorney, Agent, or Firm*—Jenkens & Gilchrist, P.C.

[57] ABSTRACT

A wavelength division multiplexer is provided that integrates an axial gradient refractive index element with a diffraction grating to provide efficient coupling from a plurality of input optical sources (each delivering a single wavelength to the device) which are multiplexed to a single polychromatic beam for output to a single output optical receiver. The device comprises: (a) means for accepting optical input from at least one optical source, the means including a planar surface; (b) a coupler element comprising (1) an axial gradient refractive index collimating lens having a planar entrance surface onto which the optical input is incident and (2) a homogeneous index boot lens affixed to the axial gradient refractive index collimating lens and having a planar but tilted exit surface; (c) a diffraction grating, such as a Littrow diffraction grating, on the tilted surface of the homogeneous index boot lens which combines a plurality of spatially separated wavelengths from the optical light; and (d) means to output at least one multiplexed, polychromatic output beam, the means including a planar surface. The device may be operated in the forward direction as a multiplexer or in the reverse direction as a demultiplexer.

32 Claims, 8 Drawing Sheets

U.S. PATENT DOCUMENTS

| | | | |
|---|---|---|---|
| 4,741,588 | 5/1988 | Nicia et al. | 350/96.19 |
| 4,744,618 | 5/1988 | Mahlein | 350/96.19 |
| 4,746,186 | 5/1988 | Nicia | 350/96.13 |
| 4,748,614 | 5/1988 | Dammann et al. | 370/3 |
| 4,749,247 | 6/1988 | Large | 350/96.16 |
| 4,752,108 | 6/1988 | Vollmer | 350/96.12 |
| 4,760,569 | 7/1988 | Mahlein | 350/3 |
| 4,763,969 | 8/1988 | Khoe et al. | 350/96.19 |
| 4,773,063 | 9/1988 | Hunsperger et al. | 370/3 |
| 4,786,133 | 11/1988 | Gidon et al. | 350/96.19 |
| 4,819,224 | 4/1989 | Laude | 370/3 |
| 4,834,485 | 5/1989 | Lee | 350/96.19 |
| 4,836,634 | 6/1989 | Laude | 350/96.19 |
| 4,857,726 | 8/1989 | Kinney et al. | 250/226 |
| 4,923,271 | 5/1990 | Henry et al. | 350/96.19 |
| 4,926,412 | 5/1990 | Jannson et al. | 370/3 |
| 4,930,855 | 6/1990 | Clark et al. | 350/96.19 |
| 4,934,784 | 6/1990 | Kapany et al. | 350/96.18 |
| 5,026,131 | 6/1991 | Jannson et al. | 350/3.7 |
| 5,107,359 | 4/1992 | Ohuchida | 359/124 |
| 5,119,454 | 6/1992 | McMahon | 385/49 |
| 5,170,451 | 12/1992 | Ohshima | 385/43 |
| 5,228,103 | 7/1993 | Chen et al. | 385/14 |
| 5,278,687 | 1/1994 | Jannson et al. | 359/125 |
| 5,355,237 | 10/1994 | Lang et al. | 359/130 |
| 5,363,220 | 11/1994 | Kuwayama et al. | 359/3 |
| 5,371,813 | 12/1994 | Artigue | 385/24 |
| 5,440,416 | 8/1995 | Cohen et al. | 359/127 |
| 5,442,472 | 8/1995 | Skrobko | 359/110 |
| 5,450,510 | 9/1995 | Boord et al. | 385/37 |
| 5,457,573 | 10/1995 | Iida et al. | 359/569 |
| 5,500,910 | 3/1996 | Boudreau et al. | 385/24 |
| 5,513,289 | 4/1996 | Hosokawa et al. | 385/33 |
| 5,526,155 | 6/1996 | Knox et al. | 359/130 |
| 5,541,774 | 7/1996 | Blankenbecler | 359/653 |
| 5,555,334 | 9/1996 | Ohnishi et al. | 385/93 |
| 5,583,683 | 12/1996 | Scobey | 359/127 |
| 5,606,434 | 2/1997 | Feldman et al. | 359/3 |
| 5,657,406 | 8/1997 | Ball | 385/24 |
| 5,703,722 | 12/1997 | Blankenbecler | 359/653 |
| 5,742,416 | 4/1998 | Mizrahi | 359/134 |
| 5,745,270 | 4/1998 | Koch | 359/124 |
| 5,745,271 | 4/1998 | Ford et al. | 359/130 |
| 5,745,612 | 4/1998 | Wang et al. | 385/24 |
| 5,748,350 | 5/1998 | Pan et al. | 359/130 |
| 5,748,815 | 5/1998 | Hamel et al. | 385/37 |
| 5,768,450 | 6/1998 | Bhagavatula | 385/24 |
| 5,777,763 | 7/1998 | Tomlinson, III | 359/130 |
| 5,835,517 | 11/1998 | Jayaraman et al. | 372/50 |

OTHER PUBLICATIONS

T. Miki et al., Viabilities of the wavelength–division–multiplexing transmission system over an optical fiber cable, IEEE Transactions on Communications, vol. Com–26, No. 7 (Jul. 1978).

K. Aoyama et al., Optical demultiplexer for a wavelength division multiplexing system, Applied Optics, vol. 18, No. 8 (Apr. 15, 1979).

K. Aoyama et al., Low–loss optical demultiplexer for WDM systems in the 0.8–$\mu$m wavelength region, Applied Optics, vol. 18, No. 16 (Aug. 15, 1979).

R. Watanabe et al., Optical Demultiplexer Using Concave Grating in 0.7–0.9 um Wavelength Region, Electronics Letters, vol. 16, No. 3 (Jan. 31, 1980).

K. Kobayashi et al., Microopitc Grating Multiplexers and Optical Isolators for Fiber–Optic Communications, Journal of Quantum Electronics, vol. QE–16, No. 1 (Jan. 1980).

Yohi Fujii et al., Optical Demultiplexer Using a Silison Echelette Grating, Journal of Quantum Electronics, vol. QE–16, No. 2 (Feb. 1980).

W. J. Tomlinson, Applications of GRIN–rod lenses in optical fiber communication systems, Applied Optics, vol. 19, No. 7 (Apr. 1, 1980).

A. Nicia, Wavelength Multiplexing and Demultiplexing Systems for Singlemode and Multimode Fibers, Conference Proceedings, European Conference on Optical Communication (Sep. 8–11, 1981).

B. D. Metcalf et al., High–capacity wavelength demultiplexer with a large–diamter GRIN rod lens, Applied Optics, vol. 21, No. 5 (Mar. 1, 1982).

J. Lipson et al., Low–Loss Wavelength Division Multiplexing (WDM) Devices for Single–Mode Systems, Journal of Lightwave Technology, vol. LT–1, No. 2 (Jun. 1983).

G. Winzer, Wavelength Multiplexing Components—A Review of Single–Mode Devices and their Applications, Journal of Lightwave Technology, vol. LT–2, No. 4 (Aug. 1984).

H. Ishio et al., Review and Status of Wavelength–Division––Multiplexing Technology and Its Application, Journal of Lightwave Technology, vol. LT–2, No. 4 (Aug. 1984).

Y. Fujii et al., Optical Demultiplexer Utilizing an Ebert Mounting Silicon Grating, Journal of Lightwave Technology, vol. LT–2, No. 5 (Oct. 1984).

J. Lipson et al., A Four–Channel Lightwave Subsystem Using Wavelength Division Multiplexing, IEEE Journal of Lightwave Technology, vol. LT–3, No. 1 (Feb. 1985).

B. Hillerich et al., Wide Passband Grating Multiplexer for Multimode Fibers, Journal of Lightwave Technology, vol. LT–3, No. 3 (Jun. 1985).

J. Lipson et al., A Six–Channel Wavelength Multiplexer and Demultiplexer for Single Mode Systems, Journal of Lightwave Technology, vol. LT–3, No. 5 (Oct. 1985).

I. Nishi et al., Broad Passband Multi/Demultiplexer for Multimode Fibers Using a Diffraction Grating and Retroreflectors, Journal of Lightwave Technology, vol. LT–5, No. 12 (Dec. 1987).

B. Moslehi et al., Fiber–optic wavelength–division multiplexing and demultiplexing using volume holographic gratings, Optic Letters, vol. 14, No. 19 (Oct. 1, 1989).

Y. Huang et al., Wavelength–division–multiplexing and –demultiplexing using substrate–mode grating pairs, Optics Letters, vol. 17, No. 22 (Nov. 15, 1992).

M. Wu et al., Design Considerations for Rowland Circle Gratings Used in Photonic Integrated Devices for WDM Applications, Journal of Lightwave Technology, vol. 12, No. 11 (Nov. 1994).

A. Stavdas et al., Design of a holographic concave grating used as a multiplexer/demultiplexer in dense wavelength–routed optical networks with subnanometer channel spacing, Journal of Modern Optics, vol. 42, No. 9, pp. 1863–1874 (Sep. 1995).

C. Zhou et al., Four Channel Multimode Wavelength Division Demultiplexer (WDM) System Based on Surface–normal Volume Holographic Gratings and Substrate–guided Waves, SPIE, vol. 3288 (no date available).

A. Stavdas et al., Free–Space Aberration–Corrected Diffraction Grating Demultiplexer for Application in Densely–Spaced, Subnanometer Wavelength Routed Optical Networks, IEEE Electronic Letters, vol. 31, No. 16, pp. 1368–1370 (Aug. 1995).

D. Wisely, High performance 32 channel HDWDM multiplexer with 1nm channel spacing and 0.7nm bandwidth, SPIE, vol. 1578, Fiber Networks for Telephony and CATV (1991) (no month available).

A. Cohen et al., Active management of 100–GHz–spaced WDM channels, Optical Fiber Communication Conference and the International Conference on Integrated Optics and Optical Fiber Communication, Technical Digest, Conference Edition (Feb. 24, 1999).

B. Keyworth et al., Low Loss, Temperature Stable Diffraction Grating Wavelength (DE) Multiplexer, National Fiber Optic Engineers Conference, Technical Proceedings, vol. I (Sep. 13–17, 1998).

M. Seki et al., 20–Channel Micro–Optic Grating Demultiplexer for 1.1–1.6um Band Using a Small Focusing Parameter Graded–Index Rod Lens, Electronic Letters, vol. 18, No. 6 (Mar. 18, 1982).

A. Koonen, A Compact Wavelength Demultiplexer Using Both Interference Filters and a Diffraction Grating, European Conference of Optical Communications, Conference Proceedings (Sep. 8–11, 1981).

J. Conradi et al., Laser Based WDM Multichannel Video Transmission System, Electronic Letters, vol. 17, No. 2 (Jan. 22, 1981).

J. Laude et al., Wavelength division multiplexing/demultiplexing (WDM) using diffraction gratings, SPIE, vol. 503, Application, Theory, and Fabricationof Periodic Structures (1984) (No month available).

A. Livanos et al., Chirped–grating demulitplexer in dielectric waveguides, Applied Physics Letters, vol. 30, No. 10 (May 1977).

H. Obara et al., Star Coupler Based WDM Switch Employing Tunable Devices With Reduced Tunability Range, Electronic Letters, vol. 28, No. 13 (Jun. 1992).

A. Willner et al., 2–D WDM Optical Interconnections Using Multiple–Wavelength VCSEL's for Simultaneous and Reconfigurable Communication Among Many Planes, IEEE Phoyonics Technology Letters, vol. 5, No. 7 (Jul. 1993).

M. Wang et al., Five Channel Polymer Waveguide Wavelength Division Demultiplexer for the New Infrared, IEEE Photonics Technology Letters, vol. 3, No. 1 (Jan. 1991).

M. Li et al., Two–channel surface–normal wavelength demultiplexer using substrate guided waves in conjunction with multiplexed waveguide holograms, Appl. Phys. Lett., vol. 66, No. 3 (Jan. 1995).

J. Laude et al., Stimax, A Grating Multiplexer for Monomode or Multimode Fibers, Ninth European Conference on Optical Communicaton–ECOC83, Geneva, Switzerland (Oct. 23–26, 1983).

W.J. Tomlinson, "Wavelength multiplexing in multimode optical fibers", Applied Optics, vol. 16, No. 8, pp. 2180–2194 (Aug. 1977).

A.C. Livanos et al, "Chirped–grating demultiplexers in dielectric waveguides", Applied Physics Letters, vol. 30, No. 10, pp. 519–521 (May 15, 1977).

Hideki Ishio et al, "Review and status of wavelength–division multiplexing technology and its application", Journal of Lightwave Technology, vol. LT–2, No. 4, pp. 448–463 (Aug. 1984).

H. Obara et al, "Star coupler based WDM switch employing tunable devices with reduced tunability range", Electronic Letters, vol. 28, No. 13, pp. 268–270 (Jun. 18, 1992).

A.E. Willner et al, "2–D WDM optical interconnections using multiple–wavelength VCSEL's for simultaneous and reconfigurable communication among many planes", IEEE Photonics Technology Letters, vol. 5, No. 7, pp. 838–841 (Jul. 1993).

Yang–Tang Huang et al, "Wavelength–division–multiplexing and –demeltiplexing by using a substrate–mode grating pair", Optics Letters, vol. 17, No. 22, pp. 1629–1631 (Nov. 15, 1992).

M.R. Wang et al, "Five–channel polymer waveguide division demultilexer for the near infrared", IEEE Photonics Technology Letters, vol. 3, No. 1, pp. 36–38 (Jan. 1991).

Maggie M. Li et al, "Two–channel surface–normal wavelength division demultiplexer using substrate guided waves in conjunction with multiplexed waveguide holograms", Appl. Phys. Lett. vol. 66, No. 3, pp. 262–264 (Jan. 16, 1995).

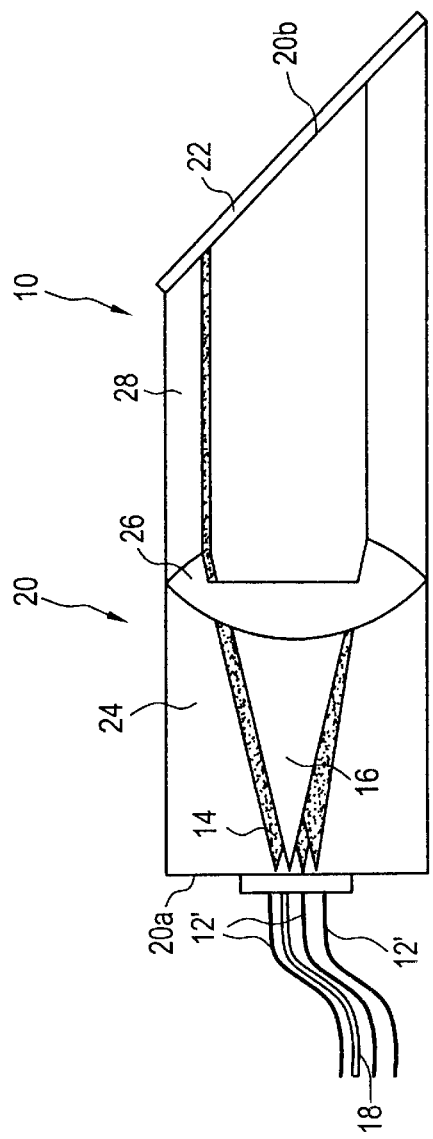
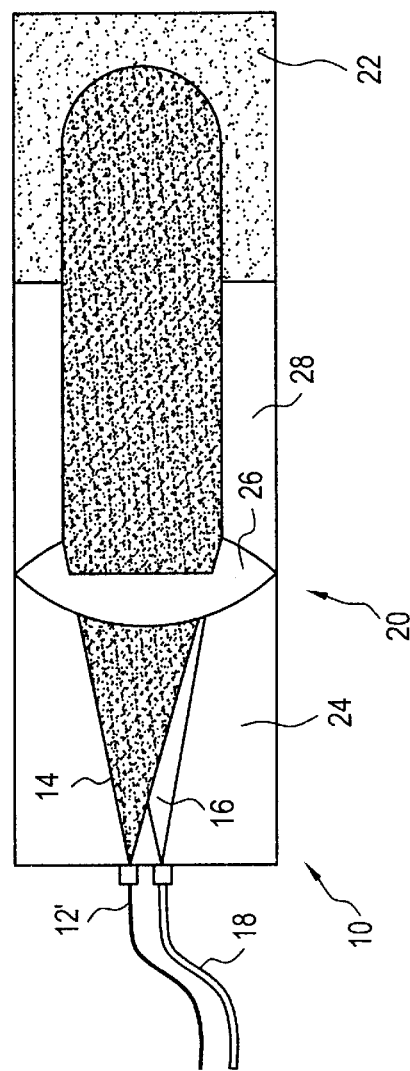

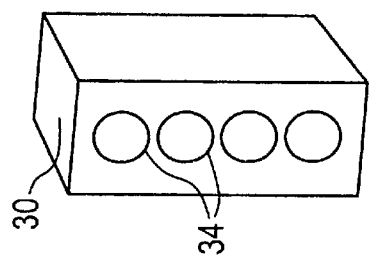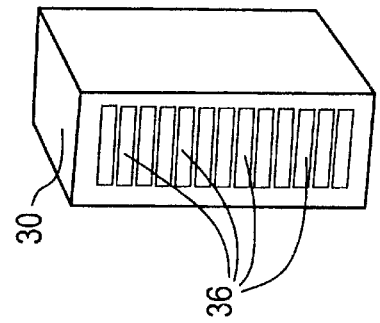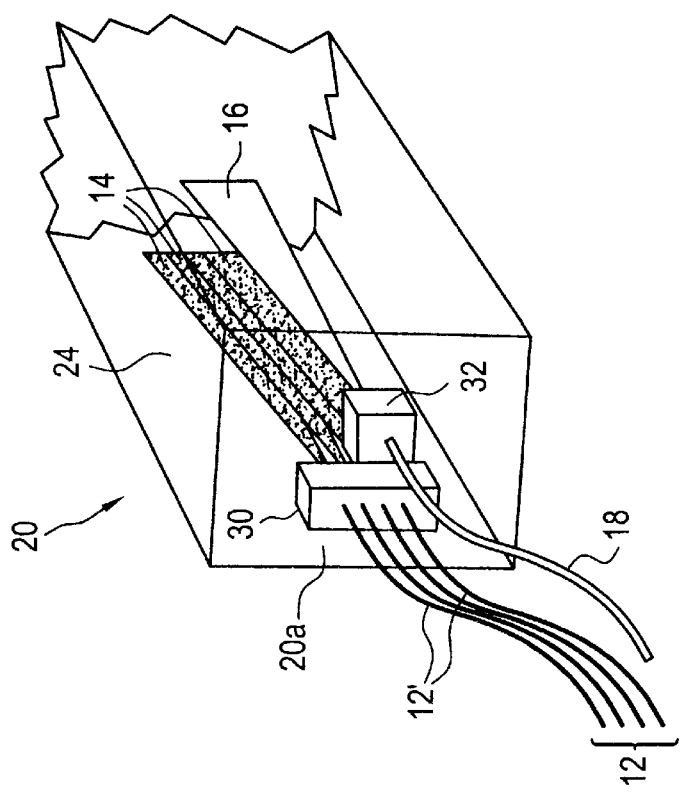

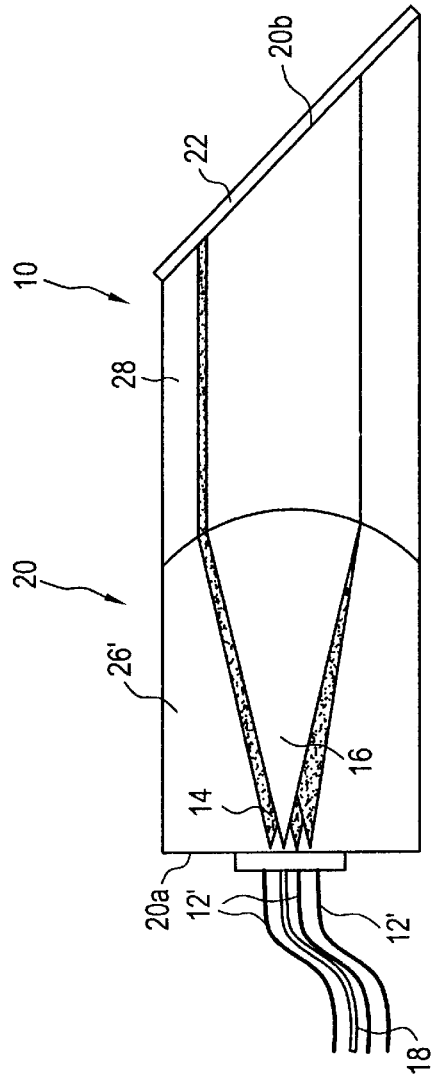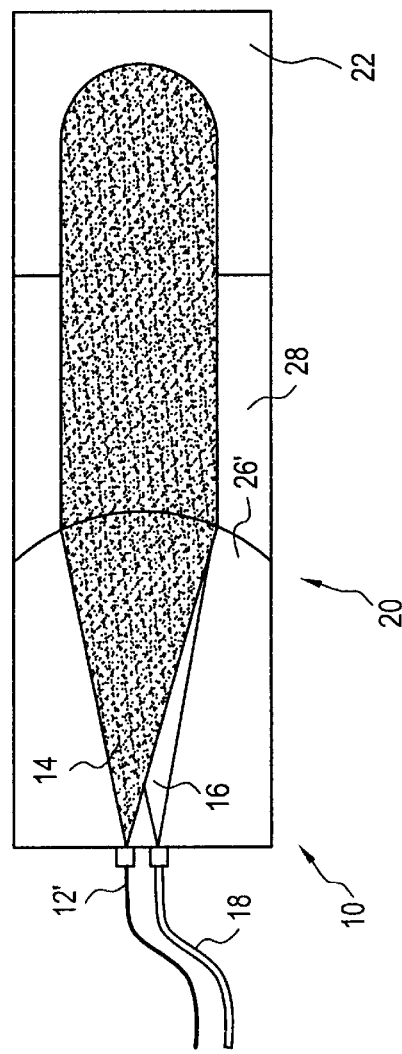

INTEGRATED BI-DIRECTIONAL AXIAL GRADIENT REFRACTIVE INDEX/ DIFFRACTION GRATING WAVELENGTH DIVISION MULTIPLEXER

CROSS-REFERENCE TO RELATED APPLICATIONS

The present application is related to two other patent applications, the first entitled "Integrated Bi-Directional Dual Axial Gradient Refractive Index/Diffraction Grating Wavelength Division Multiplexer," Ser. No. 08/990,199, and the second entitled "Integrated BiDirectional Gradient Refractive Index Wavelength Division Multiplexer" Ser. No. 08/990.198, both filed on even date herewith and assigned to the same assignee. This and the two related applications are all directed to wavelength division multiplexers, and differ in the presence or absence of a diffraction grating and the number of gradient refractive index elements.

TECHNICAL FIELD

The present invention relates generally to axial gradient refractive index lenses, and, more particularly, to axial gradient refractive index lenses employed in wavelength division multiplexing applications.

BACKGROUND ART

Wavelength division multiplexing (WDM) is a rapidly emerging technology that enables a very significant increase in the aggregate volume of data that can be transmitted over optical fibers. Traditionally, most optical fibers have been used to unidirectionally carry only a single data channel at one wavelength. The basic concept of WDM is to launch and retrieve multiple data channels in and out, respectively, from an optical fiber. Each data channel is transmitted at a unique wavelength, and the wavelengths are appropriately selected such that the channels do not interfere with each other, and the optical transmission losses of the fiber are low. Today, commercial WDM systems exist that allow transmission of 2 to 32 simultaneous channels.

WDM is a cost-effective method of increasing the volume of data (commonly termed bandwidth) transferred over optical fibers. Alternate competing technologies to increasing bandwidth include the burying of additional fiber optic cable or increasing the transmission speed on optical fiber. The burying of additional fiber optic cable costs on the order of $15,000 to $40,000 per Km. Increasing the optical transmission rate is increasing limited by speed and economy of the electronics surrounding the fiber optic system. One of the primary strategies to electronically increasing bandwidth has been to use time division multiplexing (TDM), which gangs or multiplexes multiple lower rate electronic data channels together into a single very high rate channel. This technology has for the past 20 years been very effective for increasing bandwidth; however, it is now increasingly difficult to improve transmission speeds, both from a technological and economical standpoint. WDM offers the potential of both an economical and technological solution to increasing bandwidth by using many parallel channels. WDM is complimentary to TDM, that is, WDM can allow many simultaneous high transmission rate TDM channels to be passed over a single optical fiber.

The use of WDM to increase bandwidth requires two basic devices that are conceptually symmetrical. The first device is a wavelength division multiplexer. This device takes multiple beams—each with discrete wavelengths and initially spatially separated in space—and provides a means of spatially combining all of the different wavelength beams into a single polychromatic beam suitable for launching into an optical fiber. The multiplexer may be a completely passive optical device or may include electronics that control or monitor the performance of the multiplexer. The input of the multiplexer is typically accomplished with optical fibers; however, laser diodes or other optical sources may be employed. The output of the multiplexer is typically an optical fiber.

Similarly, the second device for WDM is a wavelength division demultiplexer. This device is functionally the opposite of the multiplexer; it receives a polychromatic beam input from an optical fiber and provides a means of spatially separating the wavelengths. The output of the demultiplexer is typically interfaced to optical fibers or to photodetectors.

During the past 20 years, various types of WDMs have been proposed and demonstrated; see, e.g., (1) W. J. Tomlinson, *Applied Optics*, Vol. 16, No. 8, pp. 2180–2194 (August 1977); (2) A. C. Livanos et al, *Applied Physics Letters*, Vol. 30, No. 10, pp. 519–521 (May 15, 1977); (3) H. Ishio et al, *Journal of Lightwave Technology*, Vol. 2, No. 4, pp. 448–463 (August 1984); (4) H. Obara et al, *Electronics Letters*, Vol. 28, No. 13, pp. 1268–1270 (Jun. 18, 1992); (5) A. E. Wiliner et al, *IEEE Photonics Technology Letters*, Vol. 5, No. 7, pp. 838–841 (July 1993); and (6) Y. T. Huang et al, *Optics Letters*, Vol. 17, No. 22, pp. 1629–1631 (Nov. 15, 1992).

However, despite all of the above approaches, designs, and technologies, there remains a real need for a WDM devices which possesses all the characteristics of: low cost, component integration, environment and thermal stability, low channel crosstalk, low channel signal loss, ease of interfacing, large number of channels, and narrow channel spacing.

DISCLOSURE OF INVENTION

In accordance with the present invention, a wavelength division multiplexer or demultiplexer combines an axial gradient refractive index element with a diffraction grating to provide an integrated, bidirectional wavelength division multiplexer or demultiplexer device. For simplicity, the multiplexer function will be extensively discussed; however, such discussions of the invention will also be directly applicable to the demultiplexer due to the symmetry of the multiplexer and demultiplexer function. The multiplexer device of the present invention comprises:

(a) a means for accepting a plurality of optical input beams containing at least one wavelength from optical fibers or other optical sources such as lasers or laser diodes, the means including a planar front surface onto which the optical input light is incident and suitable for the connection of input optical fibers or integration of other devices;

(b) a coupler subsystem comprising (1) an axial gradient refractive index collimating lens operative associated with the planar front surface and (2) a homogeneous index boot lens affixed to the axial gradient refractive index collimating lens and having a planar but tilted back surface;

(c) a near-Littrow diffraction grating operatively associated with the homogeneous index boot lens, formed or affixed at the planar exit surface of the coupler subsystem which combines a plurality of spatially separated wavelengths into at least a single polychromatic optical light beam and reflects the combined optical beam back into the coupler subsystem at essentially the same angle as the incident beams;

(d) an optional array of electrooptical elements for refracting the plurality of wavelengths to provide channel routing or switching capabilities; and (e) a means of outputting at least one multiplexed, polychromatic output beam for at least one optical fiber, said means being located at the same input sur face in (a).

The device of the present invention may be operated in either the forward direction to provide a multiplexer function or in the reverse direction to provide a demultiplexer function.

Further, the device of the present invention is inherently fully bi-directional and can be used simultaneously as a multiplexer and demultiplexer for applications such as network hubs or intersections that distribute channels to various areas of a network. The axial gradient refractive index and diffraction grating-based WDM devices of the present invention are unique because they contain one or more homogeneous index boot lenses which allows integration of all the optical components into a single integrated device. This greatly increases the ruggedness, environmental and thermal stability while simultaneously avoiding the introduction of air spaces which cause increased alignment sensitivity, device packaging complexity, and cost.

Additionally, the homogeneous index boot lenses provide large, planar surfaces for device assembly, alignment and the integration of additional device functions. The use of an axial gradient refractive index lens allows very high performance imaging from a lens with traditional spherical surfaces, thereby providing the diffraction-limited optical imaging necessary for WDM applications. Further, axial gradient refractive index lenses are formed with high quality and low cost. Alternately, aspheric shaped lenses could be used in place of axial gradient refractive index lenses; however, the collimating performance is the same, but it is exceedingly difficult to create a one-piece, integrated device with aspheric surfaces. Further, aspherical lenses are typically very costly and suffer from ghosting-types of reflections which are very undesirable.

The integration of the WDM device allows for a compact, robust, and environmentally and thermally stable system. In particular, integration of the components into a solid block maintains component alignment, which provides long-term performance in contrast to non-integrated air-spaced devices that characteristically degrade in alignment and therefore performance over time.

Overall, the present invention features a novel approach to WDM. The use of optical lenses in conjunction with a diffraction grating allows all wavelengths to be multiplexed simultaneously and treated uniformly. This is contrast to the less desirable serial WDM approaches that use interference filter-based or fiber Bragg gratings. Such serial WDM approaches suffer from significant optical loss, crosstalk, alignment, and temperature issues. Further, compared to other parallel multiplexing approaches such as array waveguide grating devices, fused fiber couplers, or tree waveguide couplers, the present invention performs the wavelength separation freely inside glass as opposed to inside of lossy waveguiding structures. Thus, the present invention has the distinct advantages of lower optical signal loss through the device and ease of assembly and alignment compared to the current art.

Other objects, features, and advantages of the present invention will become apparent upon consideration of the following detailed descriptions and accompanying drawings, in which like reference designations represent like features throughout the FIGURES. It will be apparent to one skilled in the art that additional objects, features, and advantages not expressly discussed here are inherent to and follow from the spirit of this invention.

BRIEF DESCRIPTION OF THE DRAWINGS

The drawings referred to in this description should be understood as not being drawn to scale except if specifically noted.

FIG. 1 is a side elevational schematic view (FIG. 1a) and a top plan schematic view (FIG. 1b) of a wavelength division multiplexer device of the present invention, with an axial gradient refractive index lens, near-Littrow diffraction grating, and multiple optical fiber inputs multiplexed to one optical fiber output;

FIG. 2a is a perspective view of a portion of the device of FIG. 1, illustrating in detail the input and output optical connections to the device;

FIG. 2b is a perspective view of the input portion of the device of FIG. 1, illustrating an alternate input configuration in which the input is an array of laser diodes;

FIG. 2c is a perspective view of a portion of the device of FIG. 1, illustrating an alternate output configuration for a demultiplexer device in which the output is an array of photodetectors;

FIG. 3 is a side elevational schematic view (FIG. 3a) and a top plan schematic view (FIG. 3b) similar to the device of FIG. 1, but omitting a homogeneous index boot lens element between the input and the axial gradient refractive index collimating lens;

BEST MODES FOR CARRYING OUT THE INVENTION

Figure 4:
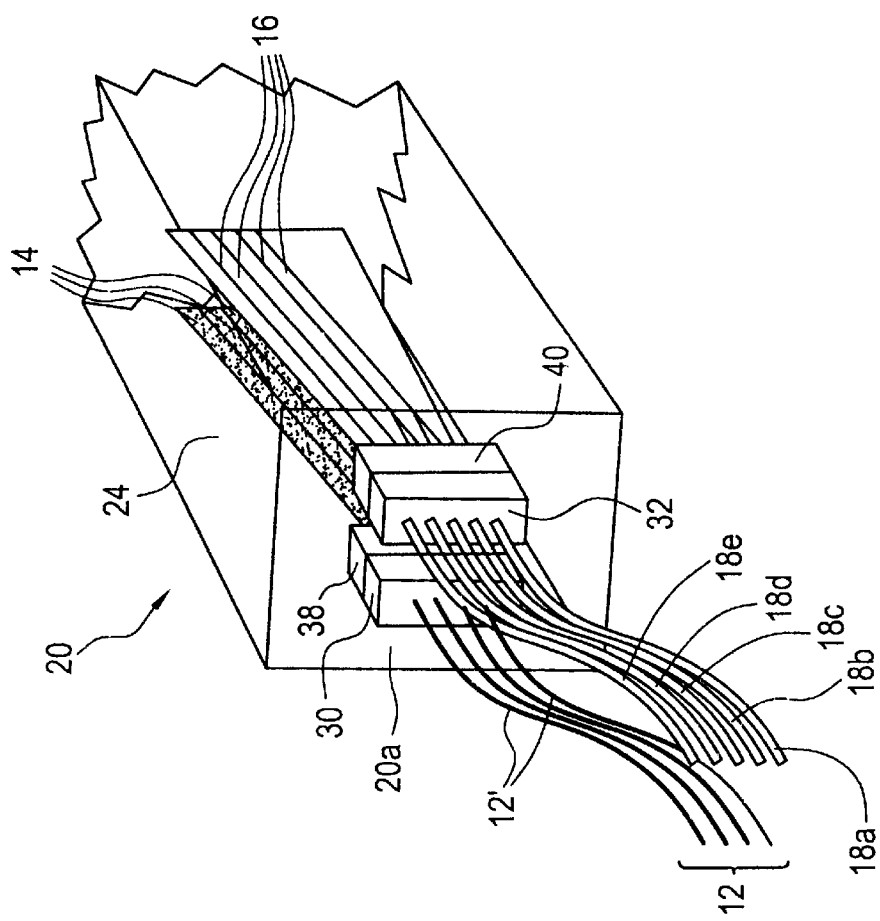
FIG. 4 is a perspective view of a portion of the device of FIG. 1, but including an array of electrooptical beamsteering elements (parallel to the grating direction) to individually beamsteer each input channel to an output fiber port.

Reference is now made in detail to specific embodiments of the present invention, which illustrate the best modes presently contemplated by the inventors for practicing the invention. Alternative embodiments are also briefly described as applicable.

FIG. 1 depicts two views of a preferred embodiment of the present invention, which embodies an axial gradient refractive index/diffraction grating wavelength division multiplexer device. Specifically, FIG. 1a illustrates the side elevational view of the device, while FIG. 1b illustrates the top plan view.

The device 10 of the first embodiment takes an input fiber array 12 of N discrete wavelengths of light 14 and spatially combines them into a single optical beam 16 and outputs the single beam to a single optical fiber output 18. Each wavelength is transmitting information superimposed on it by other means, which are not shown here and which do not form a part of this invention, but are well known in this art.

The device 10 further comprises a coupler element 20; on the exit surface 20b of the coupler element is formed or placed a near-Littrow diffraction grating 22. The near-Littrow diffraction grating 22 provides both the function of angularly dispersing optical beams of differing wavelength and reflecting the optical beams back at very nearly the same angle as the incident angle.

In the present invention, the diffraction grating 22 is used to provide angular dispersion, the amount of which depends upon the wavelength of each incident optical beam. Further, the diffraction grating 22 is oriented at a special angle relative to the optical axis of the device 10 in order to obtain the Littrow diffraction condition for one wavelength that lies within or near the wavelength range for the plurality of optical beams present. The Littrow diffraction condition requires that a light beam be incident on and reflected back from the grating at the same exact angle. Therefore, it will be readily apparent to one skilled in the art that a near-Littrow diffraction grating is used to obtain near-Littrow diffraction for each of the plurality of wavelengths present.

The Littrow diffraction angle is determined by the well-known formula $$m\lambda = 2d(\sin \alpha_i)$$

where m is the diffraction order, $\lambda$ is the wavelength, d is the diffraction grating groove spacing, and $\alpha_i$ is the same incident and diffracted angle. It will be readily apparent to one skilled in the art that the diffraction grating angle depends upon numerous variables, which may be varied as necessary to optimize the performance of the device. For example, variables affecting the grating diffraction angle include the desired grating diffraction order, grating blaze angle, number of channels, spatial separation of channels, and wavelength range of the device.

The coupler element 20 comprises a first homogeneous index boot lens 24 joined or affixed to an axial gradient refractive index collimating lens 26. The axial gradient refractive index lens in turn is joined or affixed to a second homogeneous index boot lens 28. The joining or affixing is accomplished using optical cement or other optically transparent bonding technique. In this first embodiment, the array 12 of optical fibers 12' are positioned so that light emanating from the end the optical fibers is incident on the entrance surface 20a of the coupler element 20. Each fiber 12' provides light beams of discrete wavelengths.

FIG. 2a depicts the details of coupling the input fiber array 12 into the coupler 20 and launching a plurality of optical beams 14 therein, one for each fiber 12', using a suitable coupler/interconnect 30. Similarly, the combined optical beam 16 is coupled into the single fiber output 18 by a suitable coupler interconnect 32. Such couplers/interconnects 30, 32 are well known in the art and do not form a part of this invention.

The plurality of spatially separated light beams 14 enters the first homogeneous index boot lens 24, where they are expanded in diameter. Subsequently, the plurality of light beams 14 enters the first axial gradient refractive index lens 26, where they are collimated and then pass through the second homogeneous index boot lens 28. At the exit surface 20b of the second homogeneous index boot lens 28, the collimated light beams are reflected by the near-Littrow diffraction grating 22, which removes the angular separation within the plurality of light beams 14 and creates a single light beam 16 containing within itself a plurality of wavelengths. The single light beam 16 passes back through the coupling element 20 in the reverse direction (first, through the second homogeneous index boot lens 28, then through the axial gradient refractive index focusing lens 26, and finally the first homogeneous index boot lens 24). The single focused beam 16 is then incident on an optical fiber 18, attached at the entrance surface 20a of the first homogeneous index boot lens 24 of the coupler element 20.

In the second homogeneous index boot lens 28, the exit surface 20b is formed with a beveled edge at the same angle as the Littrow diffraction angle given by the equation above. The bevel angle is about an axis parallel to the axis of the diffraction grating 28.

The diffraction grating 22 is formed on the far surface 20b of the coupler element 20. It may be formed by a variety of techniques, such as a three-dimensional hologram in a polymer medium, which can be attached to the exit surface 20b, such as with an optical cement. Alternatively, the diffraction grating 22 may be ruled on the exit surface 20b by a mechanical ruling engine or by other techniques or technologies well-known in this art. The ruled diffraction grating 22 could be formed directly on the exit surface 20b or formed in a separate planar material such as polymer, glass, silicon, etc., that is secured to the end of the coupler element 20, again, by an optical cement.

In order to prevent the multiplexed output beam 16 (a polychromatic beam) from being reflected directly back into the array of input beams, the input array and output fiber are symmetrically separated slightly apart from the central axis of the lens. Alternatively, a small (generally less than 3°) tilt is created in the second homogeneous index boot lens 28. This small tilt is made by rotating the back surface of the second homogeneous boot lens 28 about an axis that lies perpendicular to the ruling direction of the diffraction grating 22. This tilt spatially separates the output 18 and input array 12 for efficiency and ease of coupling in and out of the device 10. In the embodiment depicted in FIG. 1, the plurality of optical fibers 12' comprising the input array 12 and the optical fiber output 18 are shown in FIG. 2a. Again, due to the tilt in the second homogeneous index boot lens 28, the plurality of optical inputs 12' and the optical output 18, are slightly spatially separated at the first surface 20a of the first homogeneous index boot lens 24.

In the embodiment depicted in FIG. 1, a plurality of laser diodes 34, shown in FIG. 2b, may be used in place of the plurality of optical fibers 12' to provide optical beam inputs 14 for the wavelength division multiplexer 10. The array of laser diodes 34 may either be butt-coupled to the WDM device 10, may be longitudinally separated, or may have appropriate focusing lenses placed between the output face and the laser diode array to provide the best coupling and the lowest amount of signal loss or crosstalk.

In the second embodiment, the device 10 shown in FIG. 1, as with all of the devices described herein, may be operated in the converse configuration, with a single optical fiber input 18 that introduces a single polychromatic light beam 16 carrying multiple discrete wavelength channels. The channels are spatially separated by the demultiplexing function of the device 10 for output to a plurality of optical fibers 12'. Each output fiber 12' carries only a single and discrete wavelength channel. Function ally, in this embodiment, the demultiplexer provides an identical but opposite function to the multiplexer device 10 described in FIG. 1. In the demultiplexer embodiment, a plurality of photodetectors 36 shown in FIG. 2c, may be used in place of a plurality of optical fibers 12' to provide optical beam outputs for the wavelength division demultiplexer. The array of photodetectors 36 may either be butt-coupled to the WDM de vice 10, may be longitudinally separated, or may have appropriate focusing lenses placed between the output face and photodetector array to provide the lowest amount of signal loss or crosstalk.

In a third embodiment, depicted in the two views of FIG. 3, the first homogeneous index boot lens 24 is removed to create a more compact device or for devices where the use of the first homogeneous index boot lens is not necessary for performance. FIG. 3a depicts the side elevational view of the device, while FIG. 3b depicts the top plan view. In this embodiment, the axial gradient refractive index lens 26' possesses a planar exit face 20a for directly connecting to the plurality of inputs 12' and the single output fiber 18. An alternate implementation (not shown) of this third embodiment would be to incorporate an air space between the input plurality of optical fibers 12' or laser diodes 34 and the axial gradient refractive index lens 26'. The introduction of air space is not a preferred embodiment, as it increases the complexity of assembly and alignment of the multiplexer device 10 and would be subject to greater environmental and temperature instability versus the integrated block approach of the preferred embodiments of the present invention. All elements of this third embodiment are joined or affixed using optical cement or other optically transparent bonding technique.

In a fourth embodiment, shown in FIG. 4, an array of non-linear electrooptic elements 38 is integrated to provide a capability for selectively routing the multiplexed light 16 into one of several possible colinear fiber outputs 18a, 18b, 18c, 18d, 18e. This is exceedingly valuable for optical networking, whereas the wavelength division multiplexer device 10 can provide simultaneous integrated multiplexing and routing functions. The electrooptic element array 38 is an electrically controlled solidstate optical material in which the refractive index can be modified by varying the electrical current applied to the material. Such electrooptic elements are well-known in the art; examples include lithium niobate, and certain polymer materials.

The output array 18 is separated from the surface 20a by an optional spacer or blank 40. The blank 40 merely provides the same spacing as the beamsteering array 38 to enable ease of input and output coupling.

The change in refractive index is used to increase or decrease the angle of light propagation (relative to the gradient direction of the electrooptical material). It is very desirable to use electrooptical elements to independently shift the position of the light beams 14 to an arbitrary output fiber port 18. The shift direction is parallel to the input 12' and output arrays 18. As shown in FIG. 4, the array of electrooptical elements 38 is used to direct the output to one of a plurality of possible fiber outputs 18a, 18b, 18c, 18d, 18e. The plurality of output optical fibers 18a–18e is collinear. It will be appreciated that while five such output optical fibers are shown, the invention is not so limited, and any reasonable number of output optical fibers may be employed in the practice of the invention.

An alternate fifth embodiment would use the device in the same direction as a demultiplexing and routing device, in which each fiber 12' inputs a plurality of wavelengths that are demultiplexed and beamsteered to the output fiber array 18. The preferred orientation of the electrooptical element 38 is such that the spatial variation at the output face 20a of the device 10 is in a direction parallel to input array 12 and output array 18. In this alternate embodiment, the demultiplexed outputs 16 may be routed to one of many possible output arrays of fibers 18 as shown in FIG. 4. Alternately, the demultiplexed outputs may be routed to one of many possible arrays of photodetectors (not shown), as discussed above in connection with FIG. 2c.

Figure 5A:
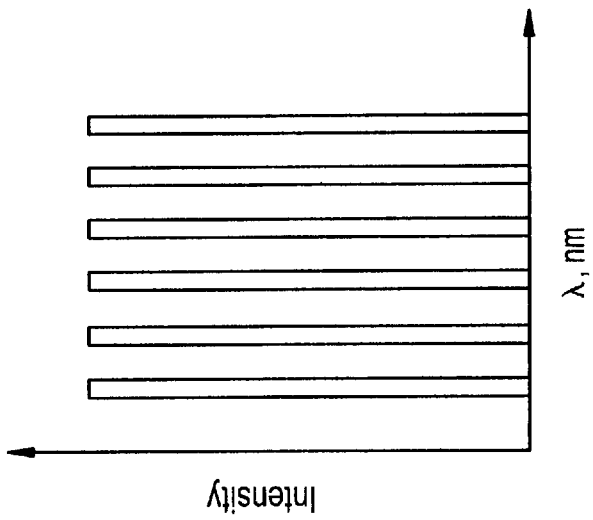
FIGS. 5a–5c are plots on coordinates of intensity and wavelength, depicting different intensity profiles for different configurations of the multiplexer of the present invention.
Figure 5B:
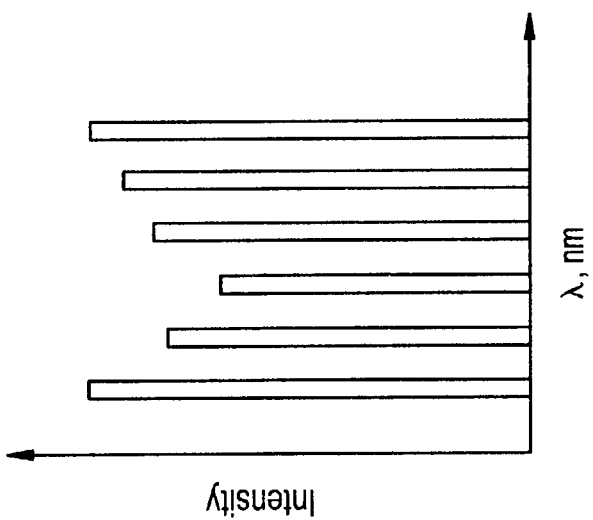
Figure 5C:
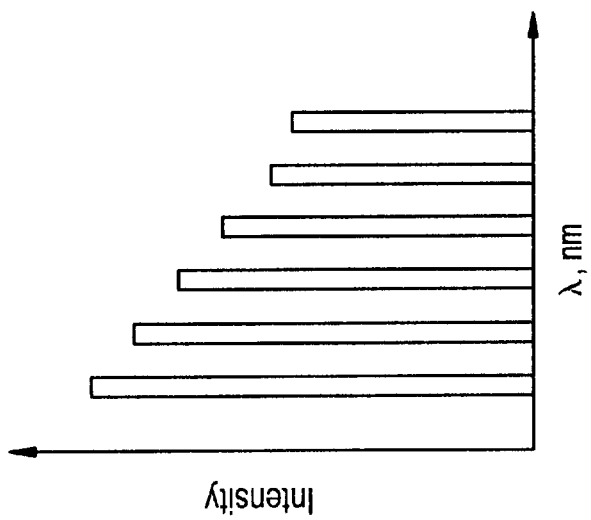

In the sixth embodiment, the device of FIG. 1 may be specially designed and constructed such that individual wavelength channels in the polychromatic output beam are unevenly focused at the output face of the multiplexer. As graphically shown in FIG. 5a, the preferential embodiment of the device of FIG. 1 creates a very uniform plurality of focused beams that have uniform intensity distributions. However, the current embodiment alters the design (such as lens curvature or axial gradient refractive index profile) of the collimating lens assembly in order to incorporate a variation in intensity distributions as a function of increasing wavelength, such as shown in FIGS. 5b and 5c. These variations need not be linear but may be fairly complex and non-linear to match the non-uniform gain profiles of optical amplifiers, laser diode arrays, or other devices in an optical network.

Figure 6:
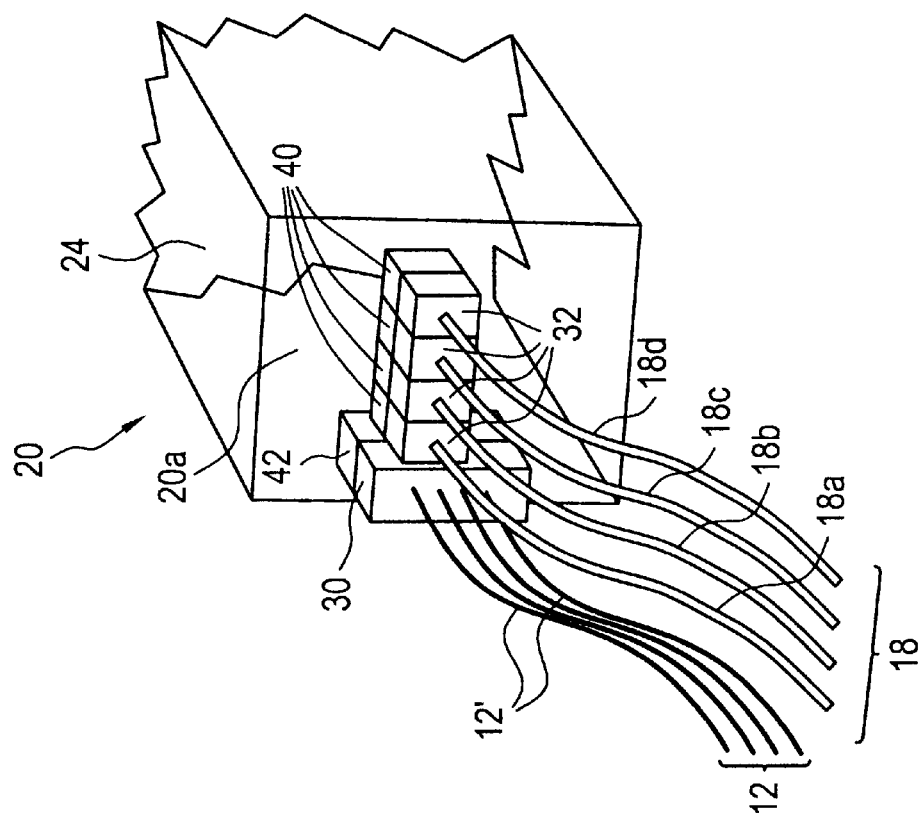
FIG. 6 is a perspective view of a portion of the device of FIG. 1, similar to that of FIG. 2a, but including an array of electrooptical beamsteering elements (perpendicular to the grating direction) to individually beamsteer each input channel to an output fiber port.

In the seventh embodiment, shown in FIG. 6, the wavelength division multiplexing device 10 of FIG. 1 is used to create a 4×4 switch and multiplexer. The basic device 10 of FIG. 1 is used to combine and/or route a plurality of wavelengths that are present at the input face 20a of the device. Integrated to the input face 20a is first an array of electrooptical beamsteering elements 42, each element being individually addressable (one element for each wavelength) and capable of directing light in a direction perpendicular to the input array 12. Each element 42 is used to direct the light from a single channel 12' to an arbitrary output port 18a, 18b, 18c, 18d. The blank 40 merely provides the same spacing as the beamsteering array 42, as in FIG. 4, to enable ease of input and output coupling.

Figure 7:
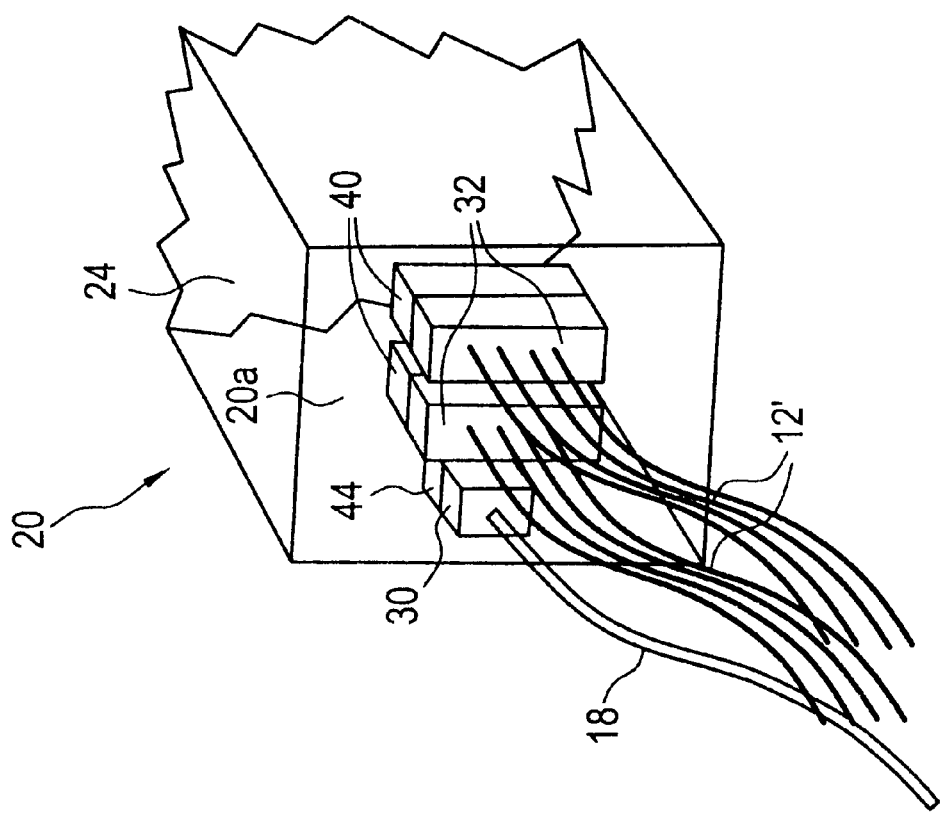
FIG. 7 is a perspective view of a portion of the device of FIG. 1, similar to that of FIG. 2a, but including an electrooptical beamsteering element to individually bearnsteer each input channel to an output fiber port.

In the eighth embodiment, shown in FIG. 7, the wavelength division multiplexing device 10 of FIG. 1 is used to create a 1×4 switch and demultiplexer. The basic device 10 of FIG. 1 is used to both separate and route a plurality of wavelengths on input fiber 18 that are present at the input face of the device 20a. Integrated to the input face 20a is first an electrooptical beamsteering element 44 capable of directing light in a direction parallel to ruling direction of the diffraction grating 22 (not shown in FIG. 7). The beamsteering element 44 is used to direct the light of a single wavelength to one of two demultiplexed output ports 12a, 12b. The blanks 40 merely provide the same spacing as the beamsteering array 44, as in FIGS. 4 and 6, to enable ease of input and output coupling.

Figure 8:
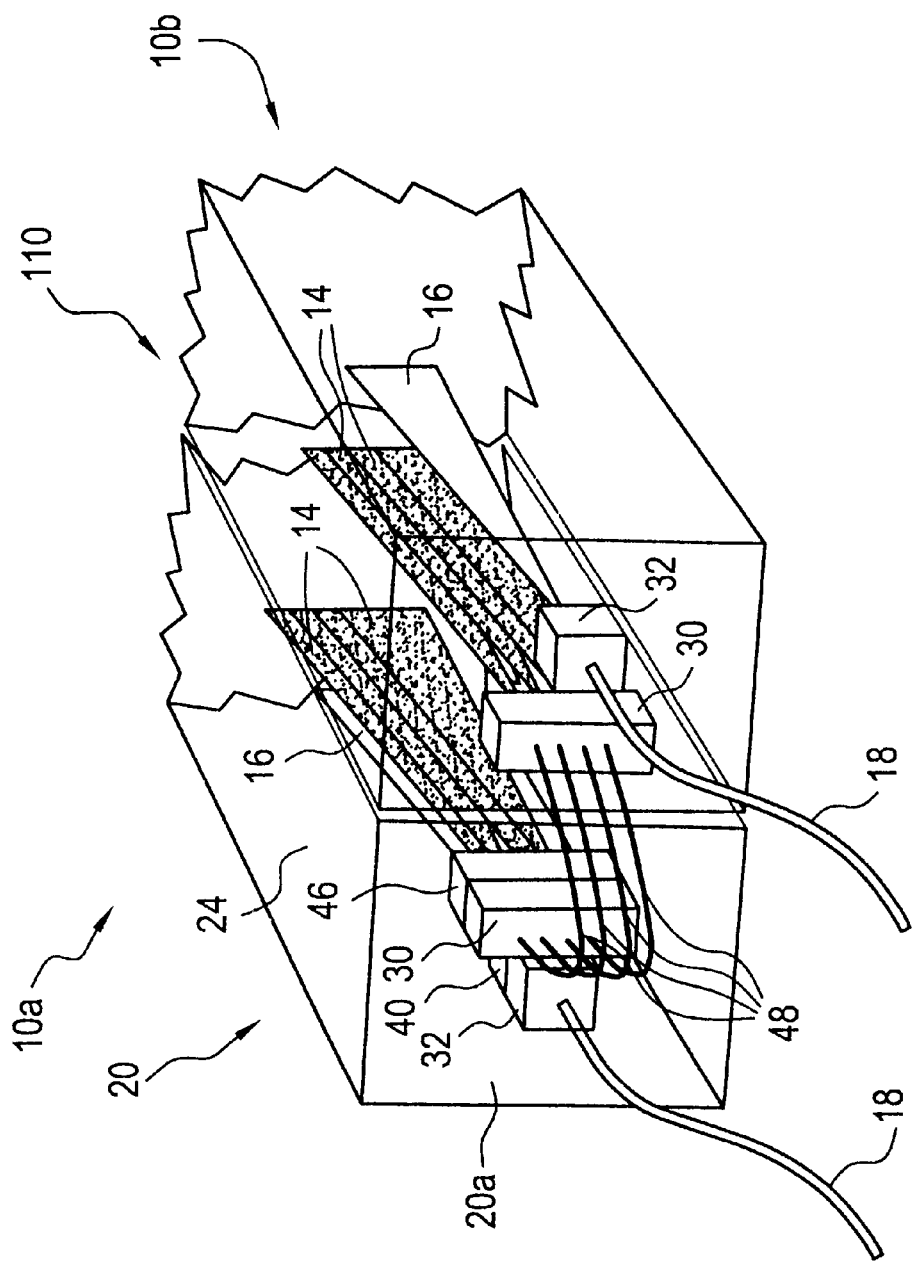
FIG. 8 is a perspective view of a portion of the device of FIG. 1, but employing two multiplexers to perform a channel blocking function by incorporating an electrooptical blocking array on the input face of one multiplexer.

In the ninth embodiment, shown in FIG. 8, the wavelength division multiplexing device 10 of FIG. 1 is used to create a 4-wavelength blocking switch 110 by using two multiplexing devices 10a, 10b and an array of electrooptical blocking elements 46. The input and output of the blocking switch device 110 is a single fiber 18 at each. This device provides a blocking function for each individual wavelength.

Attached to the output face 20a of the first multiplexer device 10a is first an array 46 of electrooptical blocking elements that are individually addressable (one element for each wavelength), which selectively block or unblock the passage of light. The array of blocking elements 46 are formed from a liquid crystal, electrochromic solid-state material, or other similar material in which the amount of transmission can be varied as a function of the power applied to the individual array element.

After the blocking array is located either Porro-type reflective prisms (not shown) or fiber loops 48 which take the individual outputs and reroute them to separate positions on the input face 20*a* of the adjacent multiplexer device 10*b*. The inputs then pass through the second device 10*b*, are multiplexed for output to a single fiber 18 on the output face 20*a* of the second device. The blank 40 merely provides the same spacing as the beamsteering array 46, as above, to enable ease of input and output coupling.

An alternate embodiment of the present device would be to use the blocking elements 46 to tailor the amount of optical energy (gain) transmitted on each wavelength. Thus, this blocking switch 110 can be used to flatten the uneven gain from other portions of the optical network by devices such as optical amplifiers, laser diode arrays, or the network in general. Examples of possible changes in the gain profile are shown in FIGS. 5*a*, 5*b*, and 5*c*, discussed above.

INDUSTRIAL APPLICABILITY

The integrated axial gradient refractive index/diffractive wavelength division multiplexer/demultiplexer of the present invention is expected to find broad application in WDM-based network and communication systems.

Thus, there has been disclosed an integrated axial gradient refractive index/diffraction grating wavelength division multiplexer and demultiplexer. It will be readily apparent to those skilled in this are that various changes and modifications of an obvious nature may be made, and all such changes and modifications are considered to fall within the scope of the present invention, as defined by the appended claims.

What is claimed is:

1. An integrated axial gradient refractive index/diffraction grating wavelength division multiplexer device comprising:
   (a) means for accepting at least one optical beam containing at least one wavelength from an optical source, said means including a planar front surface onto which said at least one optical beam is incident;
   (b) a coupler subsystem comprising (1) an axial gradient refractive index collimating lens operatively associated with said planar front surface, and (2) a homogeneous index boot lens affixed to said axial gradient refractive index collimating lens and having a planar exit surface from which said at least one optical beam exits;
   (c) a diffraction grating formed at said planar exit surface of said coupler subsystem for combining a plurality of spatially separated wavelengths from said at least one optical beam into at least one multiplexed, polychromatic optical beam and for reflecting said at least one multiplexed, polychromatic optical beam back into said coupler subsystem; and
   (d) means for outputting said at least one multiplexed, polychromatic output beam to an optical receiver, said means including said planar front surface.

2. The device of claim 1 wherein said diffraction grating is a Littrow diffraction grating.

3. The device of claim 1 wherein said planar exit surface is provided with a beveled surface at an angle that is normal to at least one wavelength diffracted by said diffraction grating, said beveled surface being angled so that incident wavelengths from said coupler subsystem are reflected back into said coupler subsystem.

4. The device of claim 1 further including at least one electrooptical element for refracting either an individual or a plurality of wavelengths to provide channel routing capabilities.

5. The device of claim 4 further comprising a non-linear electrooptical element between said optical source and said planar front surface.

6. The device of claim 4 further comprising an array of individually addressable electrooptical elements between said optical source and said planar front surface.

7. The device of claim 1 wherein said optical source is selected from the group consisting of optical fibers, lasers, and laser diodes.

8. The device of claim 7 wherein said optical source comprises at least one optical fiber transmitting a plurality of wavelengths.

9. The device of claim 7 wherein said optical source comprises a one-dimensional array of optical fibers.

10. The device of claim 7 wherein said optical source comprises a two-dimensional array of optical fibers.

11. The device of claim 7 wherein said optical source comprises a one-dimensional array of laser diodes.

12. The device of claim 7 wherein said optical source comprises a two-dimensional array of laser diodes.

13. The device of claim 1 wherein said optical receiver is selected from the group consisting of optical fibers and photodetectors.

14. The device of claim 13 wherein said optical receiver comprises a one-dimensional array of optical fibers.

15. The device of claim 13 wherein said optical receiver comprises a two-dimensional array of optical fibers.

16. The device of claim 13 wherein said optical receiver comprises a one-dimensional array of photodetectors.

17. The device of claim 13 wherein said optical receiver comprises a two-dimensional array of photodetectors.

18. The device of claim 1 wherein said at least one optical beam is incident on said coupler subsystem and exits from said coupler subsystem, thereby acting as a multiplexer.

19. The device of claim 18 wherein more than one of said at least one optical beam is incident on said coupler subsystem and exits from said coupler subsystem as said at least one multiplexed, polychromatic optical beam.

20. The device of claim 1 wherein said at least one multiplexed, polychromatic optical beam is incident on said coupler subsystem and exits from said coupler subsystem, thereby acting as a demultiplexer.

21. The device of claim 20 wherein at least one of said at least one multiplexed, polychromatic optical beam is incident on said coupler subsystem and exits from said coupler subsystem as more than one of said at least one optical beam.

22. The device of claim 1 further comprising at least one homogeneous index element between said accepting means and said coupler subsystem.

23. The device of claim 1 further including at least one electrooptical element for blocking either an individual or a plurality of wavelengths to provide channel blocking capabilities.

24. The device of claim 1 wherein said coupler subsystem provides a specifically desired function for channel output intensity as a function of wavelength.

25. An integrated axial gradient refractive index/diffraction grating wavelength division multiplexer device comprising:
   (a) an axial gradient refractive index collimating/focusing lens for collimating a plurality of monochromatic optical beams traveling along a first direction, and for focusing a multiplexed, polychromatic optical beam traveling along a second direction, the second direction being substantially opposite the first direction;
   (b) a homogeneous index boot lens affixed to the axial gradient refractive index collimating/focusing lens for transmitting the plurality of monochromatic optical beams from the axial gradient refractive index collimating/focusing lens along the first direction, and for transmitting the multiplexed, polychromatic optical beam to the axial gradient refractive index collimating/focusing lens along the second direction, the homogeneous index boot lens having a planar interface surface; and (c) a diffraction grating formed at the planar interface surface of the homogeneous index boot lens for combining the plurality of monochromatic optical beams into the multiplexed, polychromatic optical beam, and for reflecting the multiplexed, polychromatic optical beam back into the homogeneous index boot lens.

26. The device of claim 25, wherein the homogeneous index boot lens is a first homogeneous index boot lens, the device further comprising:

a second homogeneous index boot lens affixed to the axial gradient refractive index collimating/focusing lens for transmitting the plurality of monochromatic optical beams to the axial gradient refractive index collimating/focusing lens along the first direction, and for transmitting the multiplexed, polychromatic optical beam from the axial gradient refractive index collimating/focusing lens along the second direction.

27. The device of claim 26, wherein the second homogeneous index boot lens has a planar interface surface for accepting the plurality of monochromatic optical beams from an optical source, and for outputting the multiplexed, polychromatic optical beam to an optical receiver.

28. The device of claim 25, wherein the axial gradient refractive index collimating/focusing lens has a planar interface surface for accepting the plurality of monochromatic optical beams from an optical source, and for outputting the multiplexed, polychromatic optical beam to an optical receiver.

29. An integrated axial gradient refractive index/diffraction grating wavelength division demultiplexer device comprising:

(a) an axial gradient refractive index collimating/focusing lens for collimating a multiplexed, polychromatic optical beam traveling along a first direction, and for focusing a plurality of monochromatic optical beams traveling along a second direction, the second direction being substantially opposite the first direction;

(b) a homogeneous index boot lens affixed to the axial gradient refractive index collimating/focusing lens for transmitting the multiplexed, polychromatic optical beam from the axial gradient refractive index collimating/focusing lens along the first direction, and for transmitting the plurality of monochromatic optical beams to the axial gradient refractive index collimating/focusing lens along the second direction, the homogeneous index boot lens having a planar interface surface; and (c) a diffraction grating formed at the planar interface surface of the homogeneous index boot lens for separating the multiplexed, polychromatic optical beam into the plurality of monochromatic optical beams, and for reflecting the plurality of monochromatic optical beams back into the homogeneous index boot lens.

30. The device of claim 29, wherein the homogeneous index boot lens is a first homogeneous index boot lens, the device further comprising:

a second homogeneous index boot lens affixed to the axial gradient refractive index collimating/focusing lens for transmitting the multiplexed, polychromatic optical beam to the axial gradient refractive index collimating/focusing lens along the first direction, and for transmitting the plurality of monochromatic optical beams from the axial gradient refractive index collimating/focusing lens along the second direction.

31. The device of claim 30, wherein the second homogeneous index boot lens has a planar interface surface for accepting the multiplexed, polychromatic optical beam from an optical source, and for outputting the plurality of monochromatic optical beams to an optical receiver.

32. The device of claim 29, wherein the axial gradient refractive index collimating/focusing lens has a planar interface surface for accepting the multiplexed, polychromatic optical beam from an optical source, and for outputting the plurality of monochromatic optical beams to an optical receiver.

* * * * *

UNITED STATES PATENT AND TRADEMARK OFFICE
CERTIFICATE OF CORRECTION

PATENT NO. : 6,011,884
DATED : January 4, 2000
INVENTOR(S) : Robert H. Dueck, et al.

It is certified that error appears in the above-identified patent and that said Letters Patent is hereby corrected as shown below:

Column 5,
Line 59, Replace "couplers/ interconnects" with -- coupler/interconnect --.

Column 6,
Line 18, Replace "28" with -- 22 --.

Column 8,
Line 44, Replace "face of the device 20a." with -- face 20a of the device. --.

Column 9,
Lines 21-22, Replace "index/diffractive wavelength" with -- index/diffraction grating wavelength --.

Signed and Sealed this

Twenty-eighth Day of August, 2001

*Attest:*

*Attesting Officer*

NICHOLAS P. GODICI
*Acting Director of the United States Patent and Trademark Office*